Jan. 14, 1964 W. K. HALLER 3,117,907
APPARATUS FOR MAKING RECONSTITUTED SYNTHETIC MICA SHEET
Filed Oct. 1, 1958 2 Sheets-Sheet 1

INVENTOR
WOLFGANG K. HALLER
BY *Hubbell and Cohen*
ATTORNEYS.

Jan. 14, 1964  W. K. HALLER  3,117,907
APPARATUS FOR MAKING RECONSTITUTED SYNTHETIC MICA SHEET
Filed Oct. 1, 1958  2 Sheets-Sheet 2
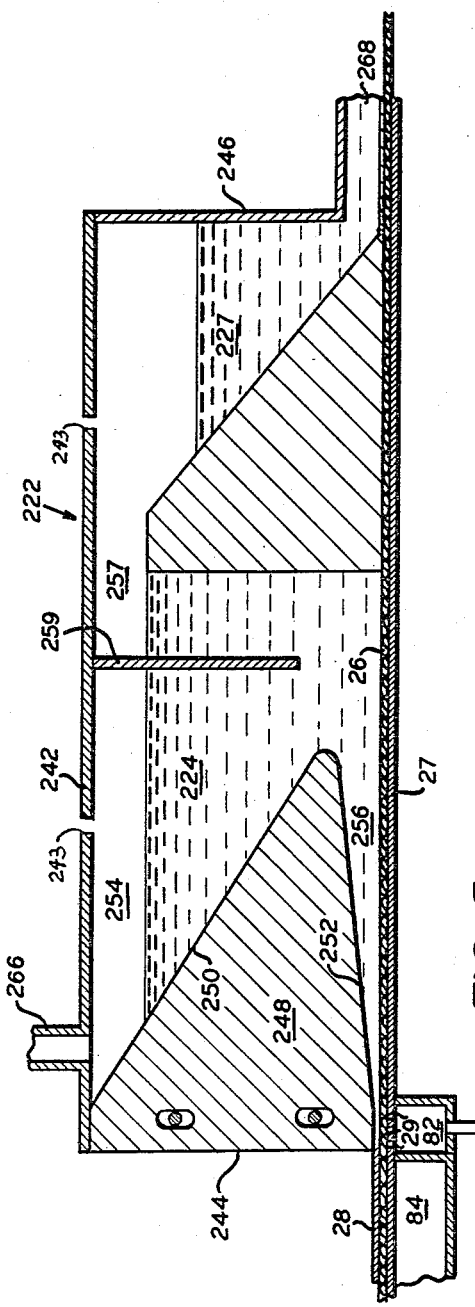
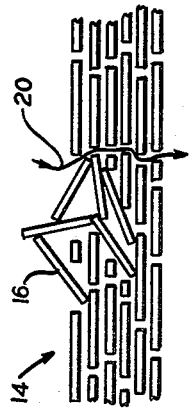
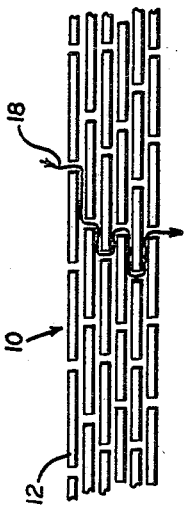
INVENTOR
WOLFGANG K. HALLER
BY *Hubbell and Cohen*
ATTORNEYS.

United States Patent Office 3,117,907
Patented Jan. 14, 1964

3,117,907
APPARATUS FOR MAKING RECONSTITUTED SYNTHETIC MICA SHEET
Wolfgang K. Haller, Washington, D.C., assignor to Mycalex Corporation of America, Clifton, N.J., a corporation of New York
Filed Oct. 1, 1958, Ser. No. 764,711
2 Claims. (Cl. 162—336)

This invention relates to a method and apparatus for making a reconstituted sheet out of a multiplicity of flakes and more particularly, the invention relates to the method and apparatus for making a reconstituted sheet out of a multiplicity of mica flakes. Most particularly, the present invention relates to the method and apparatus for making a reconstituted sheet from a multiplicity of flakes or synthetic mica which have been delaminated from a chunk or book of mica and which have been preselected in regard to their geometry.

There have been in the past attempts to take mica crystals too small for use as tube spacers and the like and to delaminate these relatively small crystals into flakes and then to reconstitute these flakes, as by a process analogous to paper making, into a continuous sheet which may be used as a substitute for mica crystals. Generally speaking, a reconstituted sheet, after being made by a paper making process, relies for its strength solely on the natural cohesive forces of the mica flake. Of course, if desired, the sheet may be strengthened by impregnating it with a suitable binder and then curing the binder. However, in this specification, except when otherwise noted, the term "reconstituted sheet" will mean an unbonded sheet made up of substantially 100% flake material such as mica. These past attempts to make reconstituted mica sheets have been made both with synthetic mica and natural mica. However, to date, and particularly with synthetic mica, the reconstituted sheet made has been a poor substitube for single mica crystals particularly with regard to mechanical strength and dielectric properties. For instance, the best reconstituted synthetic mica sheet presently available on the market has a tensile strength of only about 600 p.s.i. and a dielectric strength of only about 300 volts per mil. When this compared with the tensile and dielectric strength of synthetic mica crystal, it will be seen that the reconstituted synthetic mica sheet now available has extremely limited use as a mica substitute.

When mica flakes are disposed in close parallel relationship to each other, they exhibit a natural surface cohesion and this cohesion is sufficiently great to hold a large multiplicity of parallel flakes together in the form of a sheet. Thus, the tensile strength of a reconstituted sheet made from a multiplicity of mica flake is dependent upon the ability of the cohering forces to resist shear when the sheet is subjected to tension. Failure of the sheet in tension will be due to a sliding of adjacent flakes relative to ane another and not due to a breaking of the mica itself. The maximum resistance to shear, that is the maximum tensile strength, is obtained when there is maximum of confronting area between superposed flakes. This condition obtains when the flakes are oriented parallel to each other and are built up one on top of another much in the form of a brick wall.

Dielectric strength of a reconstituted sheet made from the multiplicity of flakes is a function of potential path length for an ionizing discharge preceding a perforating arc up to the point that the path length is so great that the dielectric strength of the flakes themselves will be exceeded before an ionizing discharge will be established. When the flakes are disposed in parallel and overlaping relationship, the potential path length for an ionizing discharge will be at a maximum, resulting in the corresponding maximization of the dielectric strength.

A proper orientation of the flakes within the sheet will therefore bring about several highly desirable results. First, the tensile strength of the sheet will be at a maximum. Second, the sheet will display a maximum dielectric strength, and third, the tensile strength, the dielectric strength and the porosity of the sheet will all be substantially uniform throughout the entire sheet.

If conventional paper making methods are employed to make a reconstituted sheet out of mica flakes, great difficulties are encountered. Methods heretofore known in the prior art can in no way be relied on to produce sheets in which the flakes are oriented parallel to each other and in overlapping relationship. In disposing the mica flakes in sheet form with conventional, previously known methods, there is an omnipresent danger of the flakes piling up in disoriented, irregular heaps. These heaps are known as "landscaping" and constitute a serious obstacle to the production of utilizable mica sheets in that the disoriented flakes introduce areas of electrical and mechanical weakness. Therefore, methods heretofore employed in the prior art have necessitated a compensation of the landscaping through a rolling of the sheet. However, when sheets containing landscaping are rolled, there is a tendency for the mica flakes to be crushed, thus introducing extremely fine flakes which weaken the sheet and contribute to a reduction of the dielectric strength in the landscaped areas. It is therefore undesirable to employ conventional paper making methods as a means of obtaining sheets which have optimum mechanical and electrical properties.

One object of the present invention is the provision of a new and improved method for orienting the flakes in a reconstituted sheet in a uniform parallel overlapping relationship to each other.

Another object of the present invention is the provision of a new and improved method and apparatus for orienting flakes prior to their disposition in sheet form whereby a landscaping or disorientation of the flakes in the sheet is eliminated.

Another object of the present invention is the provision of a new and improved method and apparatus for producing sheets having a maximum uniform tensile strength and dielectric strength.

Yet a further object of the present invention is the provision of means conductive to a highly economic and efficient manufacture of sheets from flakes.

Still another object of the present invention is to provide means whereby the orientation of flakes may be easily obtained prior to their disposition in sheet form.

The above and other objects, characteristics and features of construction will be more fully understood from the following description taken in connection with the accompanying illustrative drawings.

In the drawings:
FIG. 1 is a vertical sectional view of apparatus for making sheets from flakes;
FIG. 2 is a sectional view taken along the line 2—2 in FIG. 1;

FIG. 4 is a vertical sectional view of a head box modified according to the preferred embodiment of the present invention;

FIG. 5 is a sectional view of a reconstituted sheet made in accordance with the present invention;

FIG. 6 is a sectional view of an unsatisfactory reconstituted sheet made in the conventional manner of the prior art.

Figure 1:
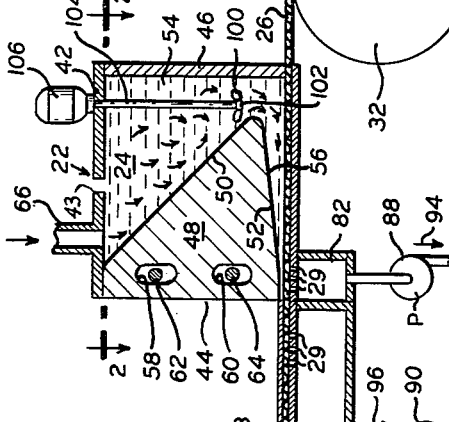

Referring now to the drawings in detail, FIG. 5 diagrammatically illustrates a reconstituted sheet 10 of synthetic mica flakes 12 which are so oriented that the sheet possesses optimum mechanical and electrical properties. FIG. 6 diagrammatically illustrates a reconstituted sheet 14 made according to conventional paper making methods and having highly undesirable mechanical and electrical properties. As will be seen, the flakes 12 in sheet 10 are oriented parallel to each other and are in mutual overlapping relationship much in the form of a brick wall. The flakes 16 in sheet 12, however, are disposed in a highly irregular orientation and are of a myriad of different sizes and shapes as a consequence of the compensatory rolling of the sheet necessitated by a "landscaping" of the flakes during their initial disposition into sheet form. Since the tensile strengths of both sheet 10 and sheet 14 are dependent upon the resistance of the cohering forces of the flakes to shear when the sheets are subjected to tension, it is clear that sheet 10 is mechanically far superior to sheet 14 since the parallel orientation and overlapping relationship to each other of flakes 12 in sheet 10 results in a maximum area of surface to surface contact between the flakes 12 and therefore a maximum coherence. The tendency of adjacent flakes in sheet 10 to slide relative to one another is thus minimized. Therefore, sheet 10 has a highly desirable maximized resistance to shear. On the other hand, sheet 14 is extremely weak and easily rupturable since the flakes 16 are highly disoriented and thus have a minimum amount of coherence to each other.

In addition, sheet 10 has superior electrical qualities to sheet 14. The potential path length for an ionizing discharge proceeding through sheet 10 is represented by an arrow 18. Since this path must wind in and out between the parallel oriented flakes 12, it is of much greater length than the thickness of sheet 10 itself. The potential path length for an ionizing discharge proceeding through sheet 14 is represented by an arrow 20. Since the flakes 16 in sheet 14 are of varying sizes and shapes due to the crushing effect of the sheet having been rolled to compensate for landscaping and since the flakes 16 are disoriented, the potential path length through sheet 14 represented by arrow 20 will be considerably shorter than that represented by arrow 18 through sheet 10 and may well be not much greater in length than the thickness of sheet 14 itself. Thus sheet 10 will have a relatively high dielectric strength, whereas sheet 12 will have an extremely low dielectric strength in comparison and will therefore be greatly inferior. In addition to having superior tensile strength and dielectric strength sheet 10 also is superior to sheet 12 in that the mechanical and electrical properties of sheet 10 will be substantially uniform throughout its entire area whereas there will be wide variations in these properties in sheet 14.

FIG. 1 shows an apparatus whereby a sheet can be produced from a multiplicity of flakes in such a manner that the orientation of the flakes approximates as closely as possible the ideal orientation of the flakes 12 shown in FIG. 5. This apparatus is generally designated by the reference numeral 21 and includes a head box 22 having an interior chamber 24 in communication with a movable belt 26. The interior chamber 24 is filled with liquid containing flakes. As will be made more apparent from the detailed discussion below, head box 22 is constructed in such a manner that the flakes are oriented in parallel relationship to each other and to belt 26 prior to their deposition in the form of a sheet 28 on belt 26. Belt 26, which rides over a bed plate 27, is disposed circularly about rollers 30 and 32 and carries the ultimately produced sheet 28 over suction means 78 and then under heating means 36. Sheet 28 and belt 26 then pass together between rollers 30 and 38 with sheet 28 subsequently diverging from belt 26 and being wound about reel 40.

The head box 22 has an upper wall 42 having a vent 43, a front wall 44, a rear wall 46 and side walls 43 and 47. An orientation member 48 is disposed within the head box and as shown herein is integral with the front wall 44. The orientation member 48 has a downwardly readwardly extending surface 50 and a surface 52 which is slightly inclined from the horizontal and tends to converge with belt 26 at the front wall 44. The orientation member 48 thus separates the inner chamber 24 into two chamber portions, upper portion 54 and a lower portion 56. The entire lower portion 56 is in direct communication with belt 26. Due to the inclination of surface 52, lower portion 56 tapers in height and is narrowest at the front end of the head box.

At the front end of the head box bottom surface 52 of orientation member 48 is spaced from belt 26 a distance greater than the thickness of sheet 28. However, no liquid will escape from the head box in this area, probably because of the surface tension of the liquid itself. The orientation member 48 is provided with two apertures 58 and 60. Bolts 62 and 64 connect the orientation member 48 with the side walls 43 and 47 of the head box and extend through the apertures 58 and 60 respectively. The apertures 58 and 60 are here shown substantially larger than the bolts 62 and 64 and thus permit substantial play when the bolts are loosened. Therefore, the position of orientation member 48 relative to belt 26 may be selectively regulated to thereby alter the spacing and inclination of the inclined bottom surface 52 relative to belt 26. Of course, if it is not desired to make orientation member 48 adjustably positionable, apertures 58 and 60 may be proportioned to receive bolts 62 and 64 with close tolerance.

Belt 26 can be made of any suitable porous material such as, for instance, rayon or wire screen. It is essential, however, that the mesh openings of belt 26 be of a small enough dimension so as to preclude the possibility of their permitting the entry of any of the flakes therein, and yet large enough to allow liquid to be sucked therethrough when the belt is exposed to the sucking action of suction means 78.

Belt 26 is adapted to ride over horizontal bed plate 27. Suction means 78 is disposed below bed plate 27 and comprises two suction boxes, a rear suction box 82 and a front suction box 84. Rear suction box 82 is located below the front end of lower portion 56 of chamber 24 and extends back under the head box for a relatively short distance. The portion of bed plate 27 above rear suction box 82 is provided with a plurality of holes 29. When air is drawn in the direction of arrow 94 by means of a pump 88 suction box 82 will suck water from the front end of lower portion 56 through the pores of belt 26 via holes 29. Because of its location at the front end of lower portion 56 of chamber 24 suction box 82 will thus operate to create a continuous flow of liquid through the major length of lower portion 56, in a direction substantially parallel to belt 26, as shown by arrow 57. The reasons for this will become more apparent as this description progresses.

Front suction box 84 is spaced forward of rear suction box 82. The portion of bed plate 27 above front suction box 84 is likewise provided with a plurality of holes 29. Thus when pump 90 draws in the direction of arrow 96 suction box 84 will draw water from the interstices of sheet 28 through the belt 26 and holes 29.

Although front suction box 84 and rear suction box 82 are of similar construction, it is apparent that their functions are different. Rear suction box 82 operates to create a flow of liquid through lower portion 56, whereas front suction box 84 in no way influences the flow of liquid in lower portion 56, but instead operates to effect a drying of sheet 28, as further described hereinafter.

Figure 3:
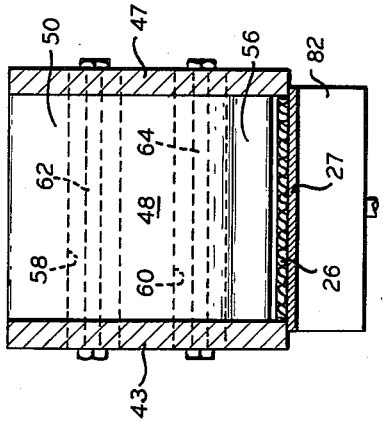
FIG. 3 is a sectional view taken along the line 3—3 in FIG. 2, and showing one form of a head box embodying the present invention.
Figure 2:
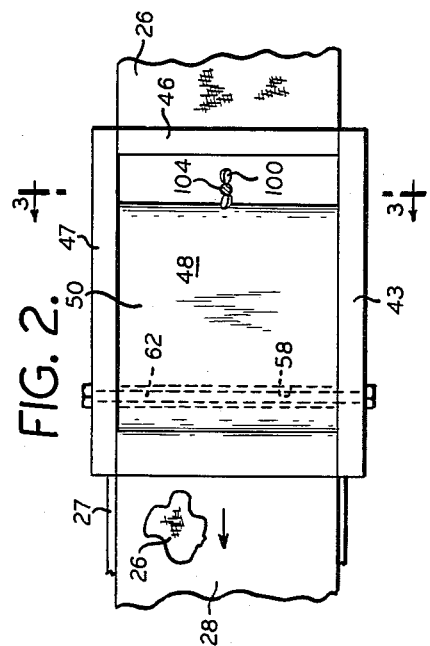

The apparatus in FIGS. 1, 2 and 3 operates as follows: the motor M is energized to rotate the roller 30 and thereby impart longitudinal movement to the belt 26. A liquid such as water containing flakes is introduced continuously into the inlet 66 for the chamber 24 of head box 22. Preferably the flakes dispersed in the liquid flowing through the inlet 66 are synthetic mica flakes having the preferred geometry of relatively large area to thickness ratio which have been selected in accordance with my co-pending U.S. patent application Serial No. 717,485, filed by me on February 25, 1958, and assigned to the assignee hereof.

Pumps 88 and 90 are energized to draw in the direction of arrows 94 and 96, respectively, and heating means 36 is also energized for heating a continuous sheet 28 as it passes thereunder as will be described hereinafter. With pump 88 operating water will be sucked from the forward end of lower chamber portion 56 to cause the liquid in chamber 24 to flow downwardly through the upper chamber portion and then horizontally through the lower chamber portion 54. This horizontal flow through the restricted cross section of lower chamber portion 56 will be substantially laminar and due to the drag between the flowing liquid and the lower surface 52 of orientation member 48 and also between the drag of the flowing liquid and the upper surface of belt 26 there will be a substantial velocity gradient in the vertical direction with maximum flow being substantially in the center of the lower chamber portion. This velocity gradient will act to orient the flakes entrained in the flowing liquid in substantially a horizontal orientation which will cause them to be oriented parallel to the moving belt 26. As the liquid and entrained flakes move forward through the lower chamber portion 56 the velocity gradient increases because of the decreasing cross section of said lower chamber portion towards the front end. Accordingly, there will be more and more orienting force to orient the flakes in a horizontal position. As the flakes move to the front end of lower chamber portion 56 the downward pull of the pump 88 will suck them down on to the belt 26 in a horizontal position which, of course, is the preferred orientation. In this manner the flakes will all be given a parallel horizontal orientation and will be in mutually overlapping relation as is desired to form sheet 28.

The multiplicity of parallel oriented flakes lying on the belt 26 will move out from under the head box 22 due to the movement of belt 26. This movement will not disorient the flakes, as there is substantial clearance between the front end of surface 52 of orientation member 48 and belt 26. However, due to surface tension no liquid will flow out as the liquid at the front end of the head box.

There will of course be liquid in the interstices of the sheet 28 and this liquid is removed partially by the suction box 84 which is connected to the pump 90. A downward pull by the pump 90 will withdraw a substantial amount of intersticial water from the sheet 28 to leave it in a relatively dry condition after it passes over the suction box 84. The remaining intersticial liquid will be readily driven off by the heating means 36 which is here shown to be a plurality of infra-red lamps 98, although any other suitable heating means may be employed to evaporate the remaining liquid in the sheet 28. After the sheet 28 has been dried by the suction box 84 and the heating means 36, it will pass under roller 38 and be rolled upon reel 40 as a finished reconstituted sheet.

It will be seen form the foregoing description that the only flakes which are deposited on the belt 26 are those which have been oriented parallel to the belt by the shearing forces resulting from the velocity gradient in the liquid flowing through the lower chamber portion 56 due to the sucking from suction box 82. In this connection it is important to note that flakes should be prevented from settling as by gravity onto the belt 26 prior to the orientation in the lower chamber portion 56. This may be accomplished by creating a turbulence in the chamber 24 in the area of communication between the upper and lower chamber portions. A substantial amount of turbulence will result by the mere changing of direction of flow in the liquid from the vertical direction in the upper chamber portion 54 to the horizontal direction in the lower chamber portion 56. This turbulence is enhanced by making the upper chamber portion triangular in configuration so that the velocity of the liquid in the area of communication between the two chamber portions is relatively high. However, if this is not sufficient to totally prevent the settling of disoriented flakes on the belt 26 at the rear of the head box 22 as by gravity, a suitable agitating means 100 may be disposed within the chamber 24 adjacent the area of communication between the two chamber portions in order to create a large amount of turbulence in said area and thus prevent settling. As shown herein the agitating means is a rotating blade 102 mounted on a rotating shaft 104 driven by a motor 106. In lieu of such a stirring means, a reciprocating agitator may be employed or any other suitable means for creating turbulence may be substituted.

The turbulence which is necessary to prevent settling of the flakes prior to orientation does tend to create some turbulence in the lower chamber portion 56 to thereby provide a disorientating influence in said lower chamber portion. However, due to the restricted cross section of the opening at the rear of the lower chamber portion 56 the turbulence will not extend very far forward into the lower chamber portion and will therefore have little or no effect on the orientation provided by the laminar flow through the lower chamber portion. This consideration is vital to the proportioning of the lower chamber portion. It will be obvious that the opening at the rear of the lower chamber portion must be sufficiently large to permit enough liquid with entrained flakes to pass into the lower chamber portion so as to form a continuous sheet 28. However, the opening should not be so large as to permit the turbulence in the area of communication between the upper and lower chamber portions to be transmitted very far into the lower chamber portion. Thus the angle approach of the surface 52 to the belt 26 will be dependent more on the longitudinal extent of the head box than will it depend upon any particular angle. That is, if the head box 22 is relatively long the angle of approach of the surface 52 to the belt 26 will be relatively small whereas if the head box is relatively short in longitudinal extent said angle will be relatively great. This is due to the fact that the angle of approach is dependent upon the extent of the opening at the rear of the lower chamber portion 56 and the longitudinal extent of the head box. Since the extent of the opening will be relatively independent of the proportion of the other parts of the head box, the angle will be mainly dependent upon the longitudinal extent of the head box. With the above teaching it is believed that any person skilled in the art will be able to work out by experimentation the angle of approach of the surface 52 toward belt 26 for any given head box made in accordance with the present invention.

The head box 22 described above operates at an equilibrium between the amount of flakes and water being withdrawn from the head box by the formation of the sheet 28 and the amount of water and flakes introduced into the head box through the inlet 66. However, it is not necessary to operate a head box made in accordance with the present invention in a state of equilibrium and, as a matter of fact, more water and flakes may be introduced into the head box through the inlet than is drawn out during the formation of the sheet. When such a method of operation is employed some manner of recirculating the excess water and flakes is preferably employed although the excess may, if desired, be discharged. A head box adapted to operate with an excess of water and flakes is shown in FIG. 4 of the drawing and is generally referred to by the reference numeral 222. Such a head box comprises an upper wall 242 having vents 243, a front wall 244 and a rear wall 246. Integrally formed on the front wall 244 is an orientation member 248 having a downwardly rearwardly extending surface 250 and a lower surface 252 which extends from the rear of the orientation member to the front thereof at an angle approaching a belt 266 exactly the same as the belt in FIG. 1. In this connection it will be understood that the head box 222 cooperates with apparatus exactly the same as apparatus 21 in FIG. 1 and is merely substituted for the head box 22 in FIG. 1.

The orientation member defines a chamber 224 which is substantially the same as chamber 24 of head box 22, having a relatively large upper chamber portion 254 and a relatively small tapered horizontally extending lower chamber portion 256. A baffle 259 depends from the upper wall 242 to define the rear of the upper chamber portion 254. The baffle also partially defines an upwardly extending passage 257 which turns in a horizontal direction to communicate with a reservoir chamber 227 at the rear of the head box. Reservoir chamber 227 is in communication with an outlet 268 at the lower end thereof.

The head box 222 is disposed so that the forward end of lower chamber portion 256 overlies suction box 82 in the same manner as in head box 22. With the suction box 82 drawing downwardly liquid with entrained mica flakes is introduced into the inlet 266 to fill a portion of the upper chamber portion 254 and all of the lower chamber portion 256. Laminar flow of the liquid and entrained flakes will be present in the lower chamber portion 256 due to the withdrawing of liquid by the suction box 82 at the front end of the lower chamber portion. However, in the modification shown in FIG. 4 more liquid and entrained flakes will be passing through the inlet 266 than can be removed by the suction box 82 and the formation of the sheet 28. This excess liquid will pass underneath the lower end of baffle 259 and upwardly through passage 257 into reservoir 227 where the liquid will be withdrawn by any suitable pumping means (not shown) through the outlet 268. The liquid and entrained flakes withdrawn through the outlet 268 may be fed back to the inlet 266 with make-up liquid and flakes. The manner of orienting the flakes in lower chamber portion 256 is precisely the same as the manner of orienting the flakes in lower chamber portion 56 of head box 22.

The head box 222 has several desirable features for a recirculating type head box. First of all, with the baffle 259 extending vertically downwardly from the upper wall 242 of the head box 222 there will be substantial turbulence in the area of communication between the upper chamber portion 254, the lower chamber portion 256 and the passage 257 with liquid moving in various directions to thus cause substantial turbulence and to prevent any settling of flakes onto the belt 26 in the area of communication of these three portions. This turbulence will be sufficient to prevent the settling, and accordingly, no auxiliary means such as agitating means 100 will be necessary. Of course, if desired, such agitating means may be employed in addition to or in lieu of baffle 259. Another advantage of the construction shown in FIG. 4 is that with a reservoir 227 included in the head box there will be relatively steady non-pulsating flow of liquid and entrained flakes through the head box 222. The pump means connected to the outlet 268 will generally operate in a pulsating manner, but the pulsations will not affect the liquid and entrained flakes in the chamber 224 as it will be isolated due to the passage 257. Thus the flow through chamber 224 will be steady and will prevent any variations in thickness of sheet etc., due to pulsation in the level of liquid in chamber 224. Of course, if a non-pulsating type pump means is employed there is no need for the reservoir 227 and outlet 268 could be connected directly to chamber 224, but preferably adjacent the upper wall 242, so as to maintain proper liquid level and upflow in the area of communication of the chamber 224 with the passage 257 to keep the area of communication extremely turbulent.

While I have herein shown and described several forms of the present invention and have suggested several variations and modifications therein, it will be understood that various other changes and modifications may be made therein within the scope of the appended claims without departing from the spirit and scope of this invention.

What I claim is:

1. In an apparatus for making paper from a multiplicity of flakes, a longitudinally movable foraminous belt, a head box above said belt for depositing said flakes onto said belt, said head box having a front end and a rear end, said head box having an interior chamber therein adapted to receive a liquid containing said flakes, an orientation member disposed within said head box for separating said chamber into an upper portion and a lower portion, said orientation member having a rearwardly downwardly extending surface defining the front wall of said uper portion of said chamber and a lower surface defining the upper wall of said lower portion of said chamber, said lower surface being so disposed relative to said belt that said lower chamber portion tapers from the rear to the front thereof, said lower portion of said chamber being adapted to convergingly communicate with said belt, means for imparting a turbulence to said liquid containing said flakes in said upper portion of said chamber to thereby prevent said flakes from settling in said upper portion of said chamber, and suction means for withdrawing liquid from the front end of said lower chamber portion to impart a laminar flow to said liquid, whereby to subject said flages in said lower chamber portion to shear force to orient said flakes parallel to said belt prior to deposition thereon.

2. In an apparatus for making paper from a multiplicity of flakes, a foraminous belt, a head box above said belt for depositing said flakes onto said belt, said head box having a front end and a rear end, said head box having an interior chamber therein adapted to receive a liquid containing said flakes, an orientation member disposed within said head box for separating said chamber into an upper portion and a lower portion, said orientation member having a rearwardly downwardly extending surface defining the front wall of said upper portion of said chamber and a lower surface extending forwardly and downwardly, thereby defining the upper wall of said lower portion of said chamber, said lower surface converging toward said belt at the front end of said head box, said lower portion of said chamber being adapted to communicate with said belt, baffle means disposed within said upper portion of said chamber for imparting a turbulence to said liquid containing said flakes in said upper portion of said chamber to thereby prevent said flakes from settling in said upper portion of said chamber, and suction means for withdrawing liquid from the front end of said lower chamber portion to impart a laminar flow to said liquid, whereby to subject said flakes in said lower chamber portion to a shear force to orient said flakes parallel to said belt prior to deposition thereon.

References Cited in the file of this patent

UNITED STATES PATENTS 1,052,927    Lamb et al. _____ Feb. 11, 1913

(Other references on following page)

UNITED STATES PATENTS

| | | |
|---|---|---|
| 1,695,873 | Williams | Dec. 18, 1928 |
| 1,775,905 | Lang | Sept. 16, 1930 |
| 1,799,350 | Barnes | Apr. 7, 1931 |
| 1,890,634 | Wenzel | Dec. 13, 1932 |
| 2,018,382 | Sale | Oct. 22, 1935 |
| 2,034,402 | Leloff | Mar. 17, 1936 |
| 2,073,654 | Smiley | Mar. 16, 1937 |
| 2,696,147 | Christy | Dec. 7, 1954 |
| 2,756,649 | Lee | July 31, 1956 |
| 2,881,674 | Johnson et al. | Apr. 14, 1959 |
| 2,914,107 | Gaines | Nov. 24, 1959 |

FOREIGN PATENTS

| | | |
|---|---|---|
| 535,589 | Germany | Oct. 14, 1931 |

OTHER REFERENCES

Casey: "Pulp and Paper," vol. I, 1952, Interscience Publishers Inc., New York, page 435. (Copy in Scientific Library.)